US012582025B2

(12) United States Patent
Williams

(10) Patent No.: US 12,582,025 B2
(45) Date of Patent: Mar. 24, 2026

(54) RAKE/VACUUM APPARATUS

(71) Applicant: Cody Mathew Williams, Birmingham, MI (US)

(72) Inventor: Cody Mathew Williams, Birmingham, MI (US)

( * ) Notice: Subject to any disclaimer, the term of this patent is extended or adjusted under 35 U.S.C. 154(b) by 558 days.

(21) Appl. No.: 18/079,248

(22) Filed: Dec. 12, 2022

(65) Prior Publication Data

US 2023/0122554 A1 Apr. 20, 2023

Related U.S. Application Data

(60) Provisional application No. 63/338,104, filed on May 4, 2022.

(51) Int. Cl.
*A01D 7/00* (2006.01)

(52) U.S. Cl.
CPC ...................................... *A01D 7/00* (2013.01)

(58) Field of Classification Search
CPC .. A01D 7/00; A01G 20/47; E01H 1/08; E01H 1/0836
See application file for complete search history.

(56) References Cited

U.S. PATENT DOCUMENTS

| | | | | | |
|---|---|---|---|---|---|
| 5,054,159 | A | * | 10/1991 | Richardson | A47L 5/14 |
| | | | | | 15/393 |
| 5,272,858 | A | * | 12/1993 | Bonis | E01H 1/0809 |
| | | | | | 15/340.2 |

| | | | | | |
|---|---|---|---|---|---|
| 5,437,078 | A | * | 8/1995 | Courcelles | A47L 13/52 |
| | | | | | 15/328 |
| 5,991,973 | A | * | 11/1999 | Simpson | A47L 9/0673 |
| | | | | | 15/344 |
| 6,280,532 | B1 | * | 8/2001 | Allen | A01G 20/47 |
| | | | | | 15/328 |
| 7,814,615 | B1 | * | 10/2010 | Ries | A47L 5/14 |
| | | | | | 15/327.5 |
| 9,585,308 | B2 | * | 3/2017 | King, Jr. | A47L 7/00 |
| 2004/0154125 | A1 | * | 8/2004 | Houvener | A47L 5/14 |
| | | | | | 15/339 |
| 2007/0157424 | A1 | * | 7/2007 | Mottahedeh | A01G 20/47 |
| | | | | | 383/103 |
| 2008/0022481 | A1 | * | 1/2008 | Reeves | E01H 1/0836 |
| | | | | | 15/330 |

(Continued)

FOREIGN PATENT DOCUMENTS

| | | | | | |
|---|---|---|---|---|---|
| DE | 202009004782 | U1 | * | 7/2009 | A01G 20/47 |
| FR | 2865748 | A1 | * | 8/2005 | A01G 20/47 |

(Continued)

*Primary Examiner* — Marc Carlson
(74) *Attorney, Agent, or Firm* — Eric Hanscom

(57) ABSTRACT

A combination rake/refuse collector has a rake portion which traps leaves and other debris, a handle portion which contains a hollow tube, a connector portion which connects the hollow tube to a vacuum unit, and a storage/processing container. The vacuum unit and storage processing container are carried via a shoulder harness with two straps on the back of user. The vacuum unit sucks leaves and other debris collected by the rake portion, through the hollow tube and the connector portion, and directs them to the vacuum storage bag where they are shredded and exhausted into the leaf vacuum bag. The handle portion allows the user to direct the rake portion.

18 Claims, 11 Drawing Sheets

(56)        References Cited

U.S. PATENT DOCUMENTS

| | | | |
|---|---|---|---|
| 2009/0071115 A1* | 3/2009 | Freewalt .................. | A01D 7/00 |
| | | | 56/13.3 |
| 2018/0249646 A1* | 9/2018 | Zhang .................... | A01G 20/47 |
| 2019/0021566 A1* | 1/2019 | Poole ........................ | A45F 3/02 |
| 2022/0159917 A1* | 5/2022 | Steinke .................... | A47L 9/08 |

FOREIGN PATENT DOCUMENTS

| | | | | | |
|---|---|---|---|---|---|
| GB | 2521249 A | * | 6/2015 | .......... | E01H 1/0809 |
| WO | WO-2011117660 A2 | * | 9/2011 | .............. | E01H 1/08 |

\* cited by examiner

RAKE/VACUUM APPARATUS

CROSS REFERENCE TO RELATED APPLICATIONS

This utility patent application claims priority back to U.S. Provisional No. 63/338,104, filed 4 May 2022, the contents of which are incorporated by reference into this application.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of devices for collecting leaves from a lawn, and more specifically toward a combination rake/vacuum apparatus that can be carried on the back of a user.

Statement of the Problem Solved

How to collect fallen leaves off a lawn or other part of a person's property has been a problem facing property owners for centuries.

Prior Art

There is considerable prior art that attempts to collect leaves on a lawn. There are simple rakes, which require a user to physically contain the leaves (usually with one hand pressing the leaves against the rake) and lifting them into a trash can or other container. There are also motorized lawn tractors that can suck up cut grass and could be used to remove and store leaves, but these are expensive and not good for fine-tuned leaf cleanup.

U.S. Pat. No. 9,961,838 to Horth describes a lawn debris collection assembly having a plenum assembly configured to be positioned in close proximate relationship with a lawn surface having lawn debris lodged between lawn blades of a lawn. The plenum assembly is movable along the lawn surface and configured to house a positive air-pressure stream in such a way that the positive air-pressure stream is directed toward the lawn debris, and the positive air-pressure stream, in use, dislodges the lawn debris from between the lawn blades. The plenum assembly is also configured to house a negative air-pressure airstream in such a way that the negative air-pressure airstream, in use, flows from the plenum assembly to a debris-collection bag. The negative air-pressure airstream, in use, urges the lawn debris to move from the plenum assembly to the debris-collection bag. This device is quite complicated and is basically a vacuum cleaner at the end of a pole.

An equally cumbersome device is found in US 20160066513 to Gray, and U.S. Pat. No. 8,266,763 to Hays requires a large bag and an unwieldy suction device.

U.S. Pat. No. 7,814,615 to Ries is a patent that covers a blower attachment to a rake, which creates an air stream generated by air stream generating device to be directed into a loosely defined plane. The raking attachment comprises a generally triangular shaped top wall, an opposing triangular shaped bottom face, side walls and an inlet throat with the side walls joined to at least a portion of the top wall and the bottom face wherein the top wall, bottom face and side walls extend longitudinally from the inlet throat. The top wall also extends beyond a terminal end of the bottom face and terminates in an end wall that is disposed at an angle relative to the top wall. However, this invention does not have the capacity to pick up the leaves and dispose of them.

U.S. Pat. No. 8,266,763 to Hays describes a leaf and lawn vacuum bagger, however this invention does not provide a backpack and lacks a rake or vacuum and also fails to provide a biodegradable paper bag for leaf storage. U.S. Pat. No. 9,364,125 to Makita provides a backpack power apparatus but fails to have a rake, a vacuum and also does not provide a leaf bag. CN 212175647 teaches another backpack-style leaf cleaning device, but this invention fails to provide a rake or vacuum, and there is no bag for disposal of leaves.

However, none of the prior art offers an easy way for a person to collect leaves and other debris from a lawn in an effective manner without requiring a large and expensive vehicle such as a lawn tractor. The current invention provides a solution by combing a rake and a vacuum in a novel manner. The invention provided is a combination rake/refuse collector that has a rake portion which traps leaves and other debris, a handle portion which contains a hollow tube, a connector portion which connects the hollow tube to a vacuum unit/processing. The vacuum unit contains a battery-driven brushless motor that turns on an alloy impeller and is carried via two straps on the back of user. The vacuum unit sucks leaves and other debris collected by the rake portion, through the hollow tube and the connector portion, and directs them to the leaf vacuum bag. The handle portion allows the user to direct the rake portion toward a bunch of leaves. The rake tines serve to flip the leaves up and back toward the vacuum intake, where it sucks them up. The bag is removable without removing the backpack to change out the bag, thereby facilitating easy and efficient disposal of leaves.

In a particularly preferred embodiment, there is a Backpack Vacuum Processing Unit (which contains a Brushless Battery powered motor that drives an aluminum alloy debris shredding impeller) and the Debris Collection Bag/Box. The size of the rake is also important. In a particularly preferred embodiment, the rake has a width of 24", such that entire lawns can be raked easily and quickly, as opposed to the small, 8" rakes that are currently in use. The device can be designed to allow for interchangeable rake heads.

In a separate embodiment, the device has the handle portion removable from the connector portion through a quick-connect, then attached to the exhaust port to turn the leaf collector into a leaf blower. In this embodiment, the rake heads can be removed to allow the blast of air from the fan to blow the leaves.

By way of a basic description of the function of one embodiment of the invention, the leaves are collected with the tines of the leaf rake that flip the leaves up and back towards the Vacuum intake device that's incorporated into the underside of the Leaf Rake. The leaves are then sucked up into the Leaf Rake Handle which is also a hollow tube. The tube is connected to a flexible tube which the leaves pass through into the Backpack Vacuum Processing Unit, which is a Battery Powered Brushless Motor that drives an aluminum alloy debris shredding impeller, and also holds a Lithium-Ion rechargeable battery. After being shredded, the leaves are exhausted as mulch into the attached Leaf collection Bag. The leaf collection bag can be a bag or box, and can be made from pretty much any paper/cardboard/paperboard or other biodegradable product. In a particularly preferred embodiment, the leaf collection device is 100%

Recyclable, Biodegradable, Compostable, and Disposable. In a preferred embodiment, the bag is made of 2-Ply Paper, and can hold both wet and dry debris. Once the Leaf Collection Bag is filled with debris, a user can momentarily turn off the power switch and the bag can be easily removed from the Card Slot on the exhaust port and placed at the curb for trash pickup, set into a compost pile, or burned. A new Bag is easily unfolded, the card on the bag is slid into the card slot, turn the power switch back on and the leaf collection bag will inflate with the exhaust air, and a user can continue to rake your lawn.

The Rake/Vacuum & Handle Tube combination is unique and very important to the function of the invention and separates this invention from everything else out there. This use of these Bags is the first all 100% recycled paper Leaf Vacuum Bags attached to an Outdoor Power Tool.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION OF THE INVENTION

Figure 1:
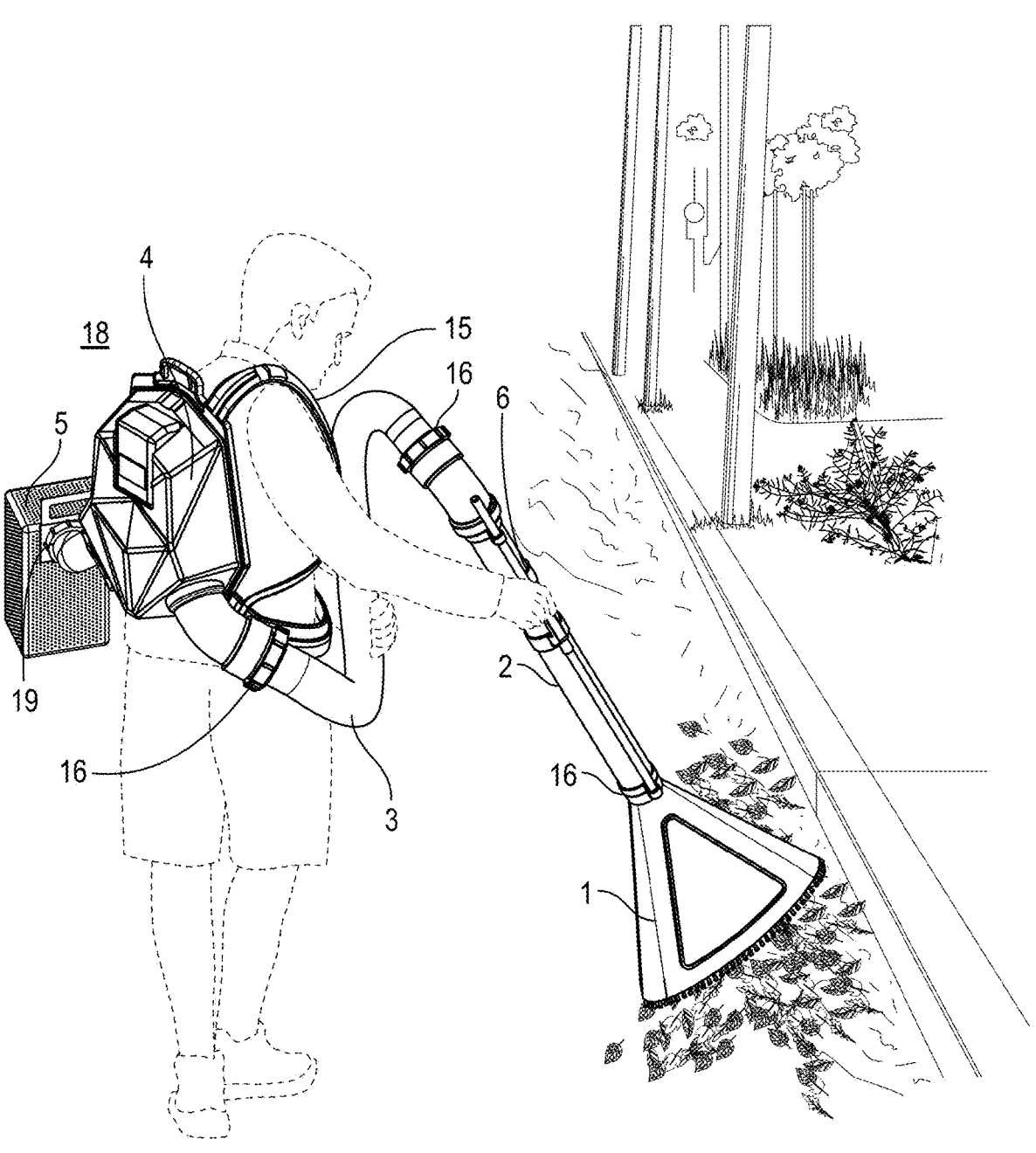
FIG. 1 is a perspective view of the rake/vacuum apparatus as being used by a person to rake/vacuum up leaves.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is a perspective view of the rake/vacuum apparatus as being used by a person to rake/vacuum up leaves. The invention has several parts. A rake portion 1 has a handle portion 2 which is connected to a vacuum 4 by a connector 3. The vacuum 4 directs the leaves into a vacuum processing/storage unit 5. The bag/box unit 5 is attached to the vacuum 4 by a quick-connect at the exhaust port 19. The vacuum portion 4 has a battery 18 in one embodiment. Inside or attached to the handle portion is a hollow tube which sucks up leaves collected by the rake portion 1. The rake portion 1 can be made in various sizes and configurations, which are interchangeable heads. The hollow tube can be attached to the handle portion 2, or the handle portion 2 can be hollow. The handle portion 2 can have side handles 6 to allow a user to grip and control the apparatus. The connector 3 is flexible, such that users with the vacuum 4 and storage bag 5 on their backs can use the handle portion 2 to direct the rake portion 1 toward bunches of leaves. The bag/box unit 5 is in one embodiment made from 2-ply paper and is biodegradable. In another embodiment, it contains a shredder that chops up leaves that are brought into it by the vacuum container. In one embodiment, the vacuum 4 can be powered by a 40V/4 am lithium-ion battery. In a second embodiment, better illustrated in FIG. 11, an electric cord can connect the device to an electrical outlet. The vacuum 4 is held on the back of the user by a shoulder harness 15, which allows the user to use both hands to control the handle and rake portions of the invention.

Figure 2:
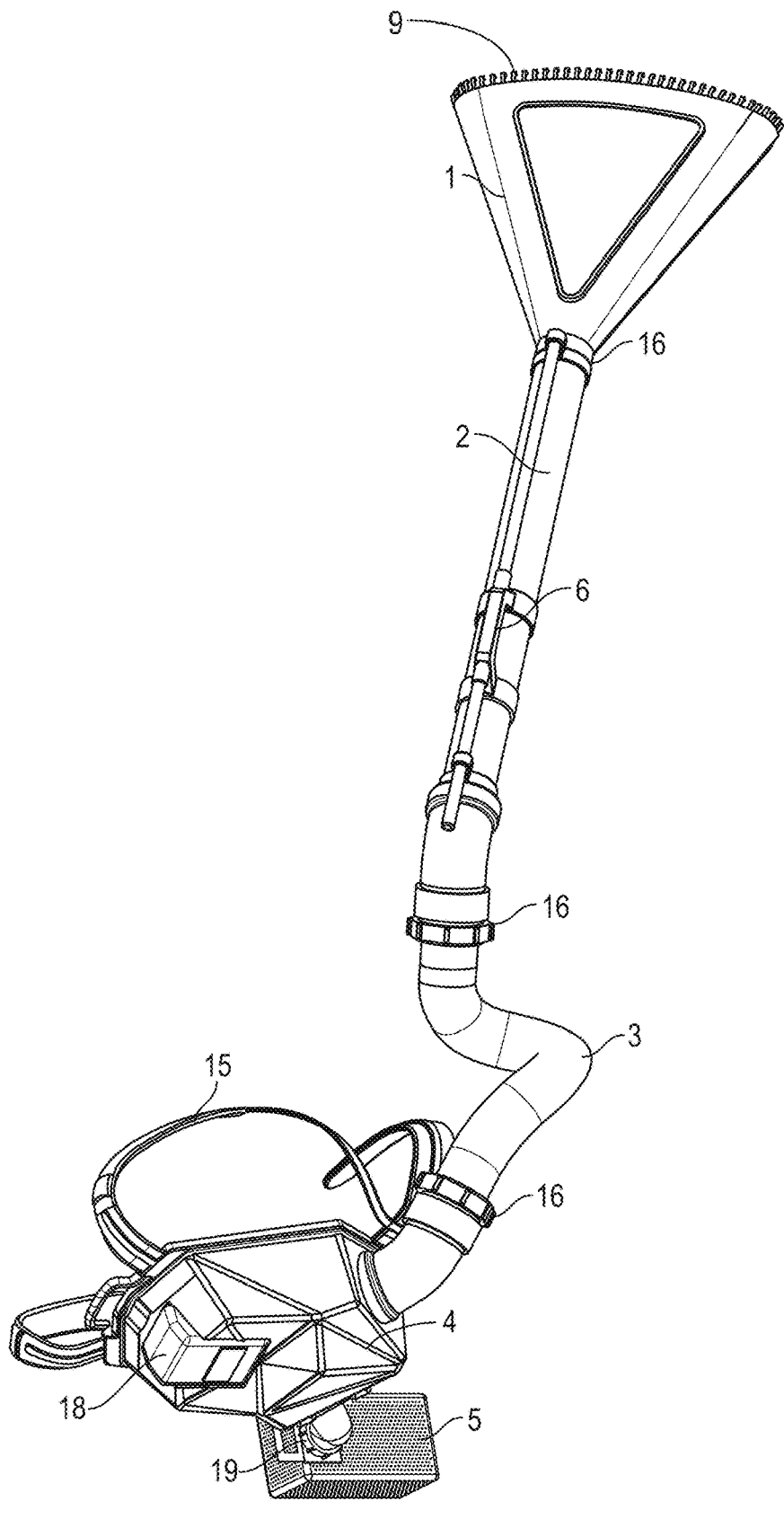
FIG. 2 is a perspective view of the rake/vacuum apparatus.

FIG. 2 is a perspective view of the rake/vacuum apparatus. The rake portion 1 has tines 9 that collect leaves. The rake portion 1 is connected to the handle portion 2. The handle portion 2 has a hollow tube through which the leaves a vacuumed up. The handle portion 2 also has a side handle 6 that allows the user to effectively grasp and control the handle and rake portions of the invention. A quick-connect connects the upper portion of the handle portion 2 to the lower portion of the connector 3. The connector 3 is a flexible tube that takes leaves from the handle portion 2 and delivers them to the vacuum portion 4. A second quick connect 16 connects the upper portion of the connector 3 to an inlet in the vacuum portion 4. Inside the vacuum portion 4, a batter, or alternatively, electricity from an electrical plug, powers the vacuum to create suction through the connector 3 and the handle portion 2, where a suction head (not shown in this figure but visible in FIG. 3. A storage/collector box 5 stores leaves processed through the vacuum unit 4. Depending on the embodiment, leaves can be sent direction into the bag/box unit 5 or can be mulched first. The storage/collector box 5 is designed to be biodegradable and can be made from any material such as 2-ply paper, cardboard, paperboard or a similar material. The bag/box unit 5 is perforated to allow for air to pass through, with perforations large enough to let air pass through, but not so large as to allow leaves or leaf particles to pass through. The storage/collector box is removable to allow a user to vacuum up enough leaves to fill the box, then quickly remove the full box and replace it with an empty box.

Figure 3:
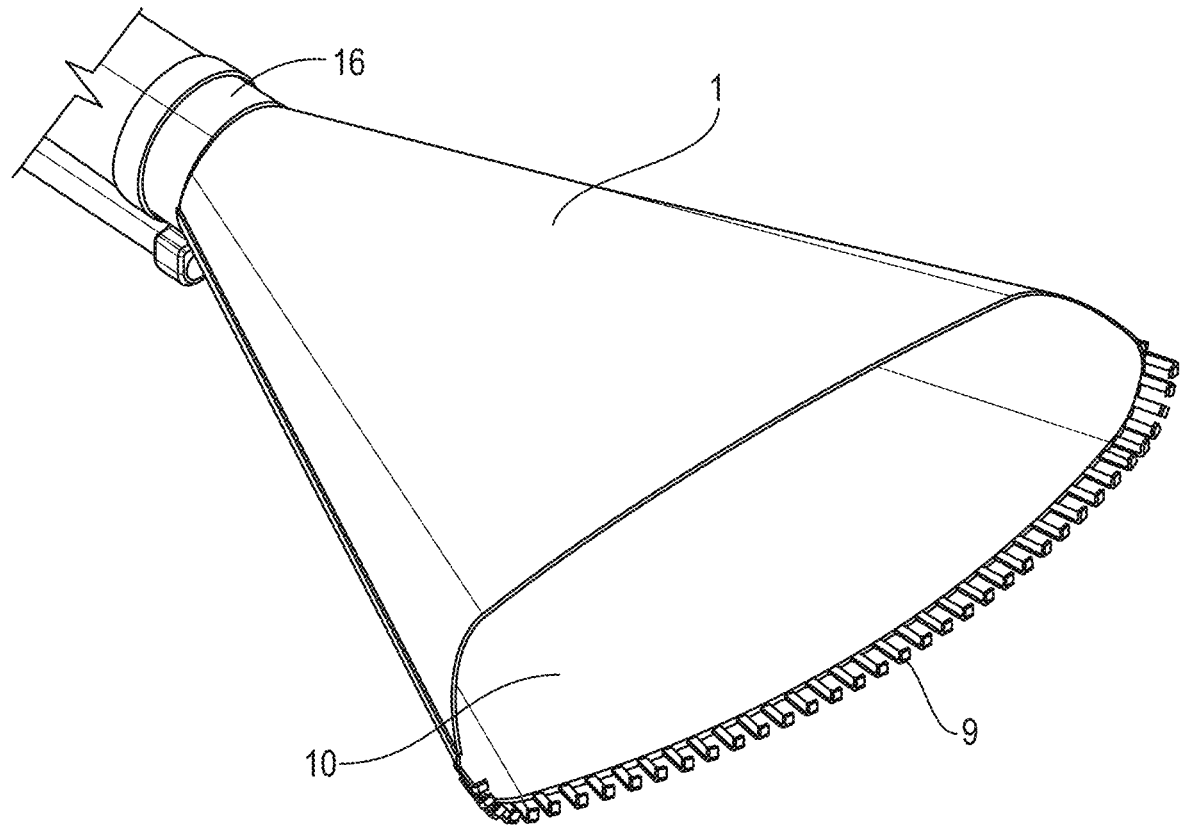
FIG. 3 is a perspective view of the rake portion of the rake/vacuum apparatus.

FIG. 3 is a perspective view of the rake portion of the rake/vacuum apparatus. The rake portion 1 has a suction head 10, which is a cavity through which leaves are pulled by the vacuum, and tines 9 which help to collect the leaves in a location where suction can pick them up. The tines in one embodiment are interchangeable, such that finer or coarser tines can be used on the same device for different purposes. It should also be noted that the device works with both dry and moist leaves, as the vacuum power is sufficient to pick up moist leaves as well as dry leaves. There are several embodiments of the rake portion, we have only illustrated a preferred embodiment. The connection between the rake portion and the handle portion allows rake portions of various shapes and sizes to be interchangeably attached to the handle portion.

Figure 4:
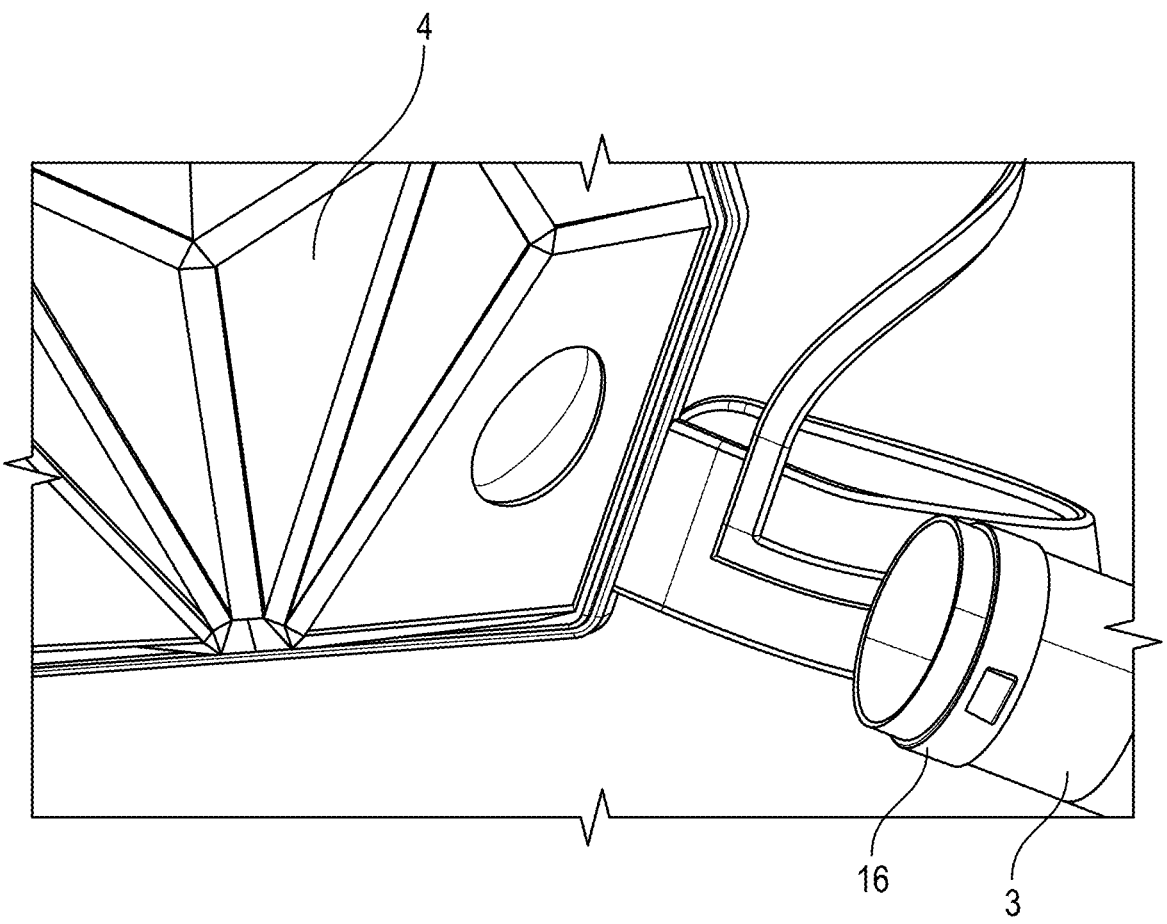
FIG. 4 is a perspective view of the quick connect portion of the rake/vacuum apparatus.

FIG. 4 is a perspective view of the quick connect portion of the rake/vacuum apparatus. The quick connect 16 allows a user to quickly and easily remove the connector 3 from the vacuum 4.

Figure 5:
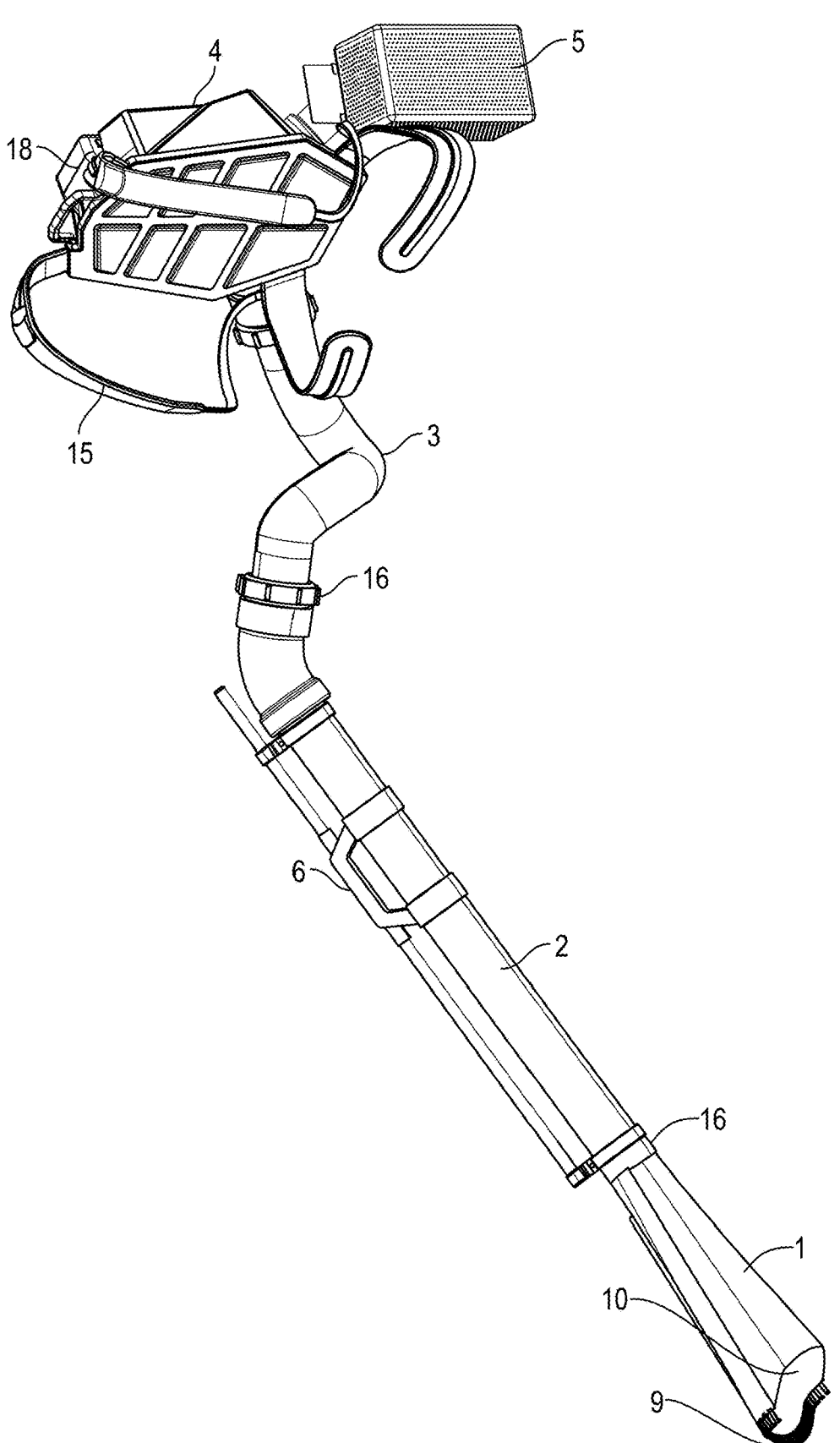
FIG. 5 is a perspective view of the invention.

FIG. 5 is a perspective view of the invention. The rake portion 1 has tines 9 that collect leaves such that a suction head 10 can suck up leaves that were collected by the tines 9. The rake portion 1 is connected to the handle portion 2. The handle portion 2 has a hollow tube through which the leaves a vacuumed up. The handle portion 2 also has a side handle 6 that allows the user to effectively grasp and control the handle and rake portions of the invention. A quick-connect connects the upper portion of the handle portion 2 to the lower portion of the connector 3. The connector 3 is a flexible tube that takes leaves from the handle portion 2 and delivers them to the vacuum portion 4. A second quick connect 16 connects the upper portion of the connector 3 to an inlet in the vacuum portion 4. Inside the vacuum portion 4, a batter, or alternatively, electricity from an electrical plug, powers the vacuum to create suction through the connector 3 and the handle portion 2, where a suction head (not shown in this figure but visible in FIG. 3. A bag/box unit 5 stores leaves processed through the vacuum unit 4. Depending on the embodiment, leaves can be sent direction into the storage/collector box 5 or can be mulched first. The storage/collector box 5 is designed to be biodegradable and can be made from any material such as 2-ply paper, cardboard, paperboard or a similar material. The bag/box unit 5 is perforated to allow for air to pass through, with perforations large enough to let air pass through, but not so large as to allow leaves or leaf particles to pass through. The storage/collector box is removable to allow a user to vacuum up enough leaves to fill the box, then quickly remove the full box and replace it with an empty box.

Figure 6:
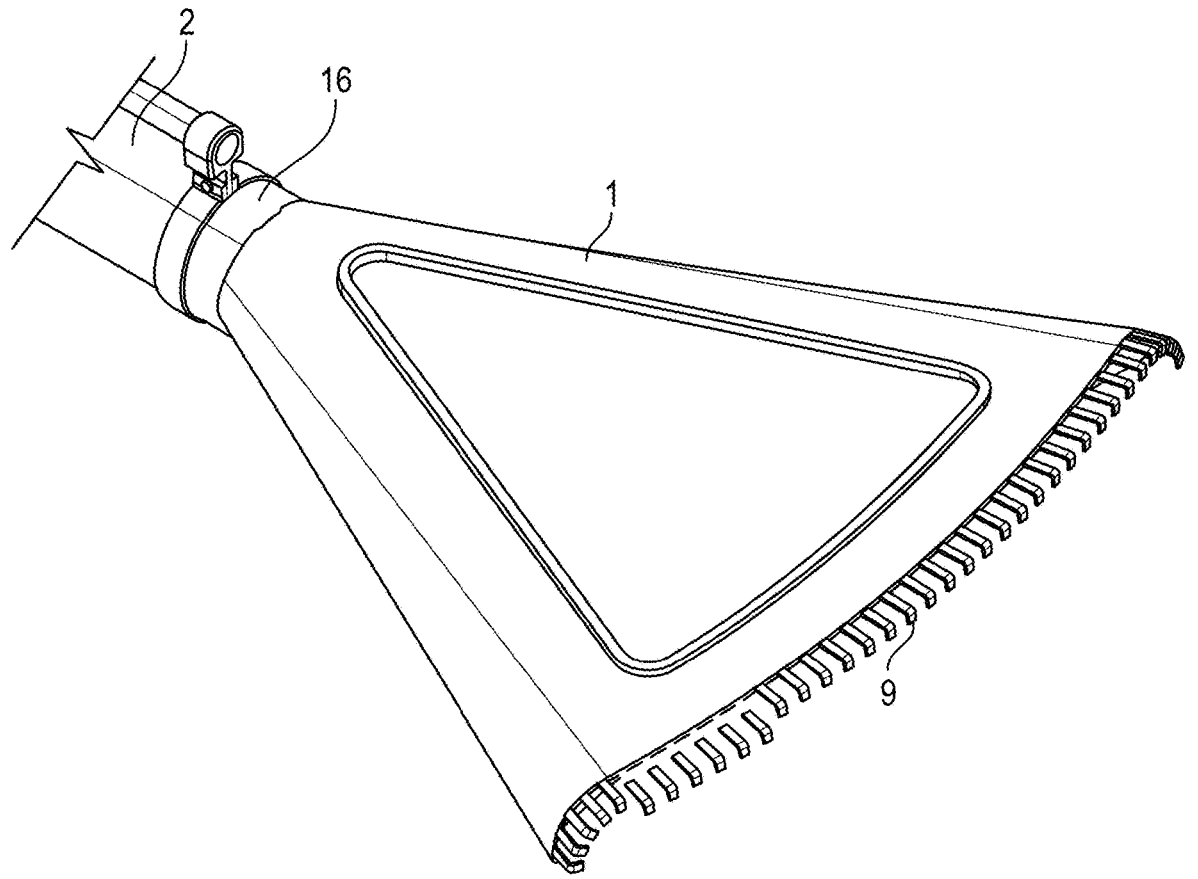
FIG. 6 is a perspective view of the rake and tines portion of the invention.

FIG. 6 is a perspective view of the rake and tines portion of the invention. The handle portion 2 is removably connected to the rake portion 1. Multiple rake portions can be interchangeably attached to the handle portion. On the rake portion 1, there are tines 9 which serve to collect the leaves. In one embodiment, the tines are interchangeable with other tines, such that a user can change the size, spacing, and resiliency of the tines depending on the type of material the user desires to vacuum up.

Figure 7:
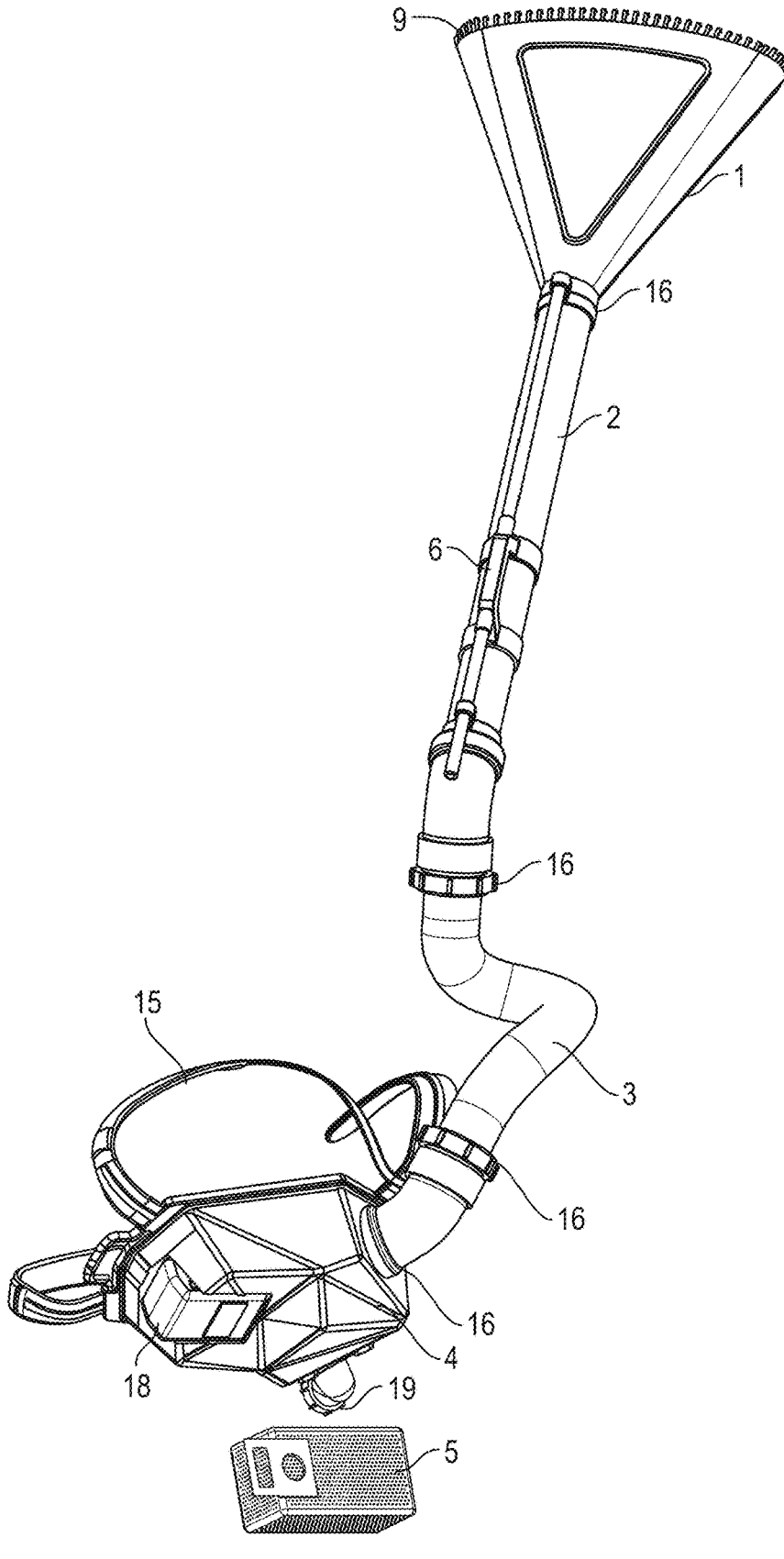
FIG. 7 is a perspective view of the invention showing the bag/box removed for disposal.

FIG. 7 is a perspective view of the invention showing the bag/box 5 removed for disposal. The figure shows how the storage/processing box 5 can be easily removed from the vacuum portion 4, when the storage/processing box becomes full. In one embodiment, the bag/box unit 5 is collapsible, such that a user can head out to clean up leaves with several folded storage/processing boxes in his/her pocket, then merely remove a full box and attach and empty box without the need to empty a full box before continuing the job.

Figure 8:
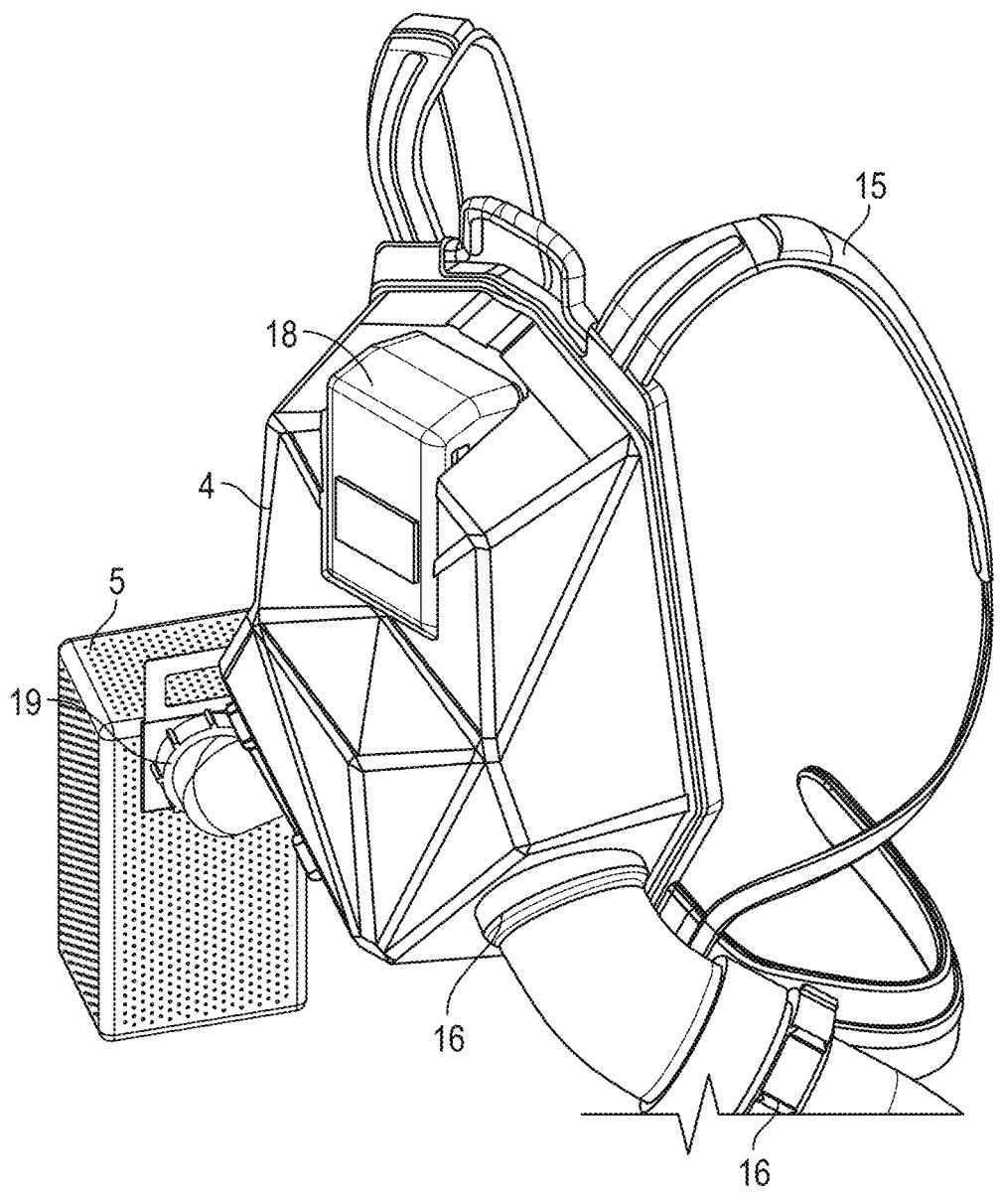
FIG. 8 is a perspective view of the vacuum and shoulder harness portion of the invention.

FIG. 8 is a perspective view of the vacuum and shoulder harness portion of the invention. The shoulder harness 15 allows a user to carry the vacuum portion 4 and the bag/box unit 5 on the user's back, freeing up both hands to control the handle portion and the rake portion. A quick connect 16 attaches the upper portion of the connector to the vacuum portion 4. It should also be noted that in one embodiment, the quick-connect on the exhaust port can be used to disconnect the bag/box unit 5. Since the bottom of the handle portion allows for interchangeable rake portions, it will also accept a wide variety of interchangeable blower portions as well.

Figure 9:
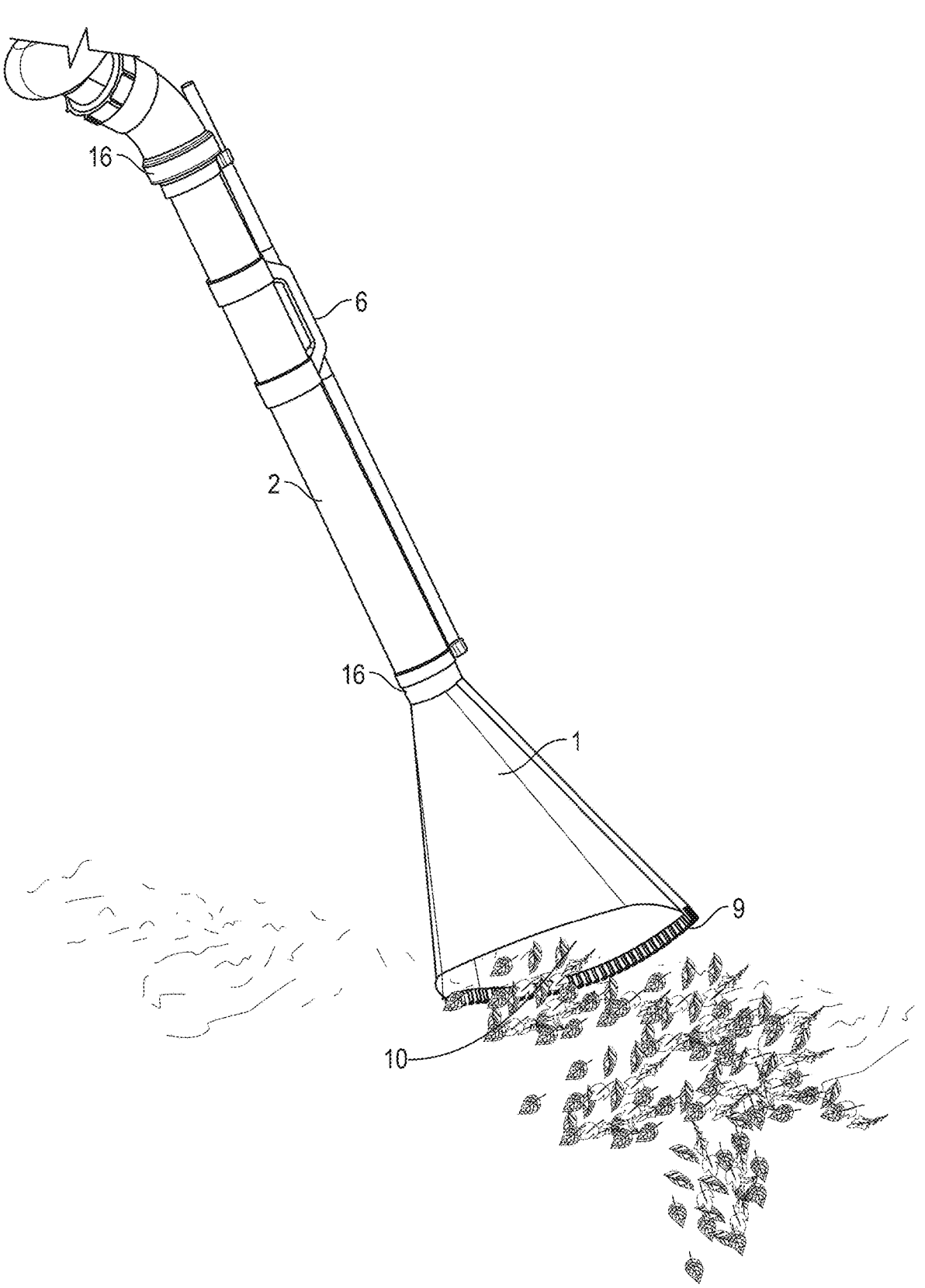
FIG. 9 is a perspective view of the rack and handle portion of the invention being used to vacuum up leaves.

FIG. 9 is a perspective view of the rack and handle portion of the invention being used to vacuum up leaves. In this figure, a side handle 6 on the handle portion 2 can be used to control the device. The rake portion 1 has tines which collect the leaves, and a suction head 10 through which the leaves are vacuumed up.

Figure 10:
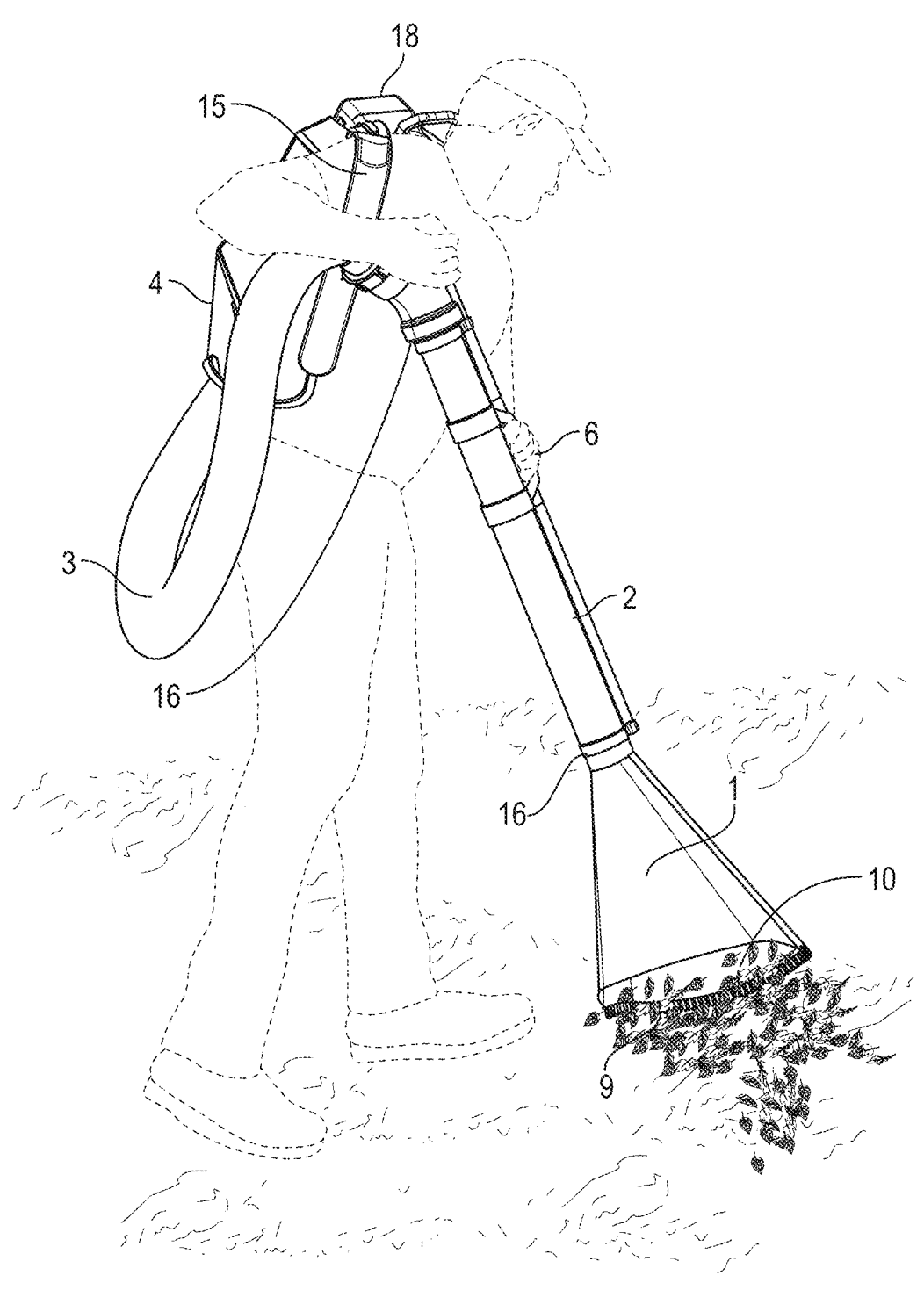
FIG. 10 is a perspective view of a person using the invention to rake/vacuum up leaves.

FIG. 10 is a perspective view of a person using the invention to rake/vacuum up leaves. In this figure, a person is controlling the device, using a side handle 6 on the handle portion 2 can be used to control the location of the suction head 10 through which the leaves are vacuumed up.

Figure 11:
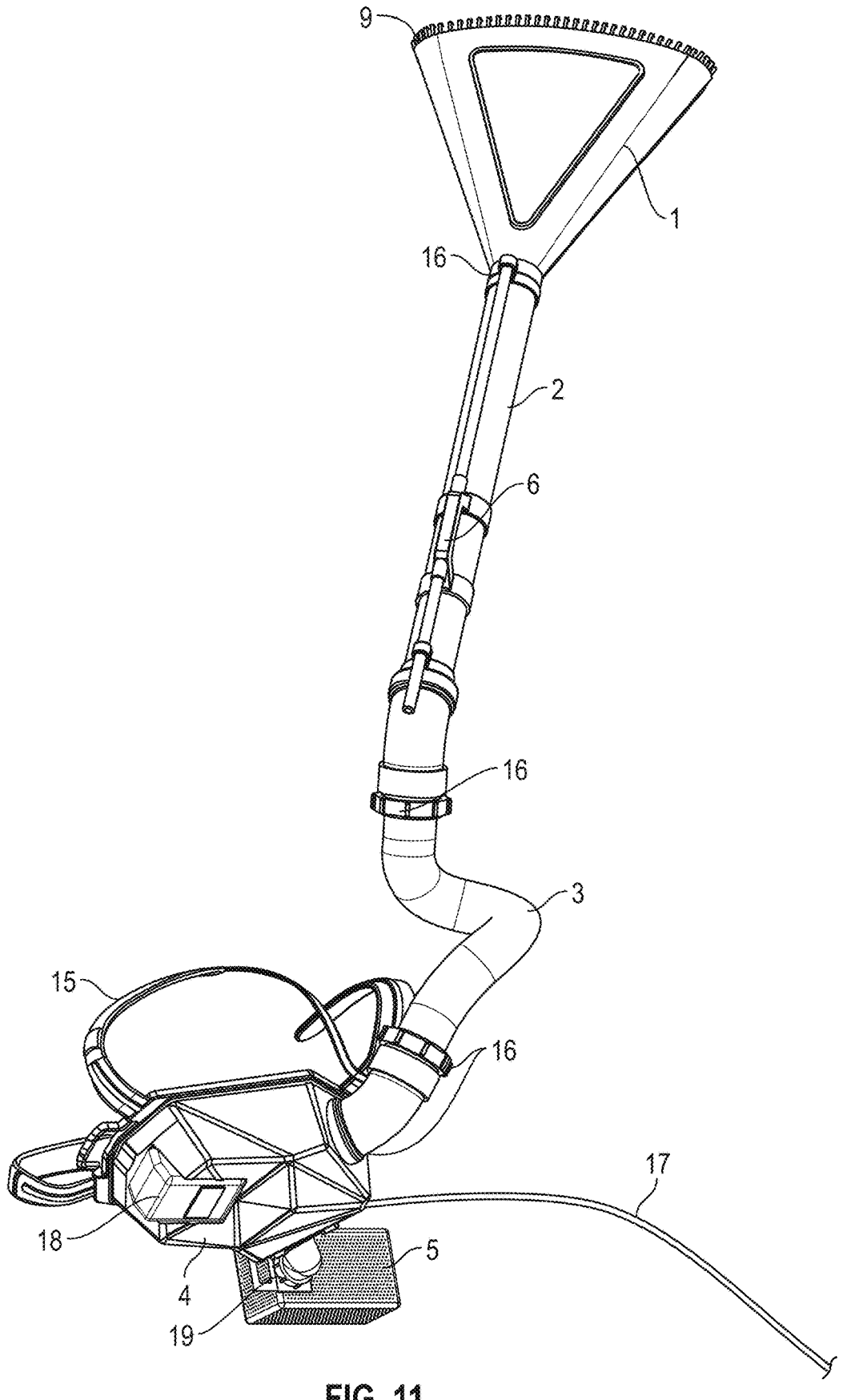
FIG. 11 is a perspective view of an electric version of the invention, where a user plugs in an electric cord to provide power to the invention.

FIG. 11 is a perspective view of an electric version of the invention, where a user plugs in an electric cord to provide power to the invention. This version of the invention is very similar that illustrated in FIG. 1, but in this case, rather than being powered by a battery housed in the vacuum portion 4, in this embodiment the power to run the vacuum comes from an electrical outlet, to which the device is attached by an electrical cord 17.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

What I claim is:

1. A device for collecting and processing leaves, consisting of a rake portion, a handle portion, a connector, a vacuum portion, and a bag/box unit, where the handle portion additionally comprises a hollow tube, where the rake portion additionally comprises a plurality of tines and a leaf rake suction head, wherein the leaf rake suction head is shaped like a standard leaf rake, and wherein the leaf rake suction head has a bottom side, a top side and two side panels, there the two side panels connect the top side to the bottom side, where the bottom side, the top side and the two side panels form an opening, where the opening has an opening height and an opening width, there the opening width is longer than the opening height, where the top side has a plurality of tines arrayed from it to facilitate the raking of leaves while simultaneously vacuuming up the leaves, where each tine has a tine body and a tine end, where each of the tine bodies extends at a 180 degree angle from the top side, and where each of the tine ends comprises a roughly 90 degree bend in a downward direction, where the downward direction is toward the bottom side, where the leaf rake suction head is connected to the hollow tube, and where the hollow tube is connected to the connector by a first quick connect, and where the connector is connected to the vacuum by a second quick connect, where the plurality of tines direct a quantity of leaves toward the leaf rake suction head, where the vacuum generates an amount of suction, where the amount of suction picks up the quantity of leaves from in front of the leaf rake suction head and pulls them through the leaf rake suction head, first through the hollow tube, second through the connector, and third, into the vacuum, and fourth, through a mulching impeller and exhausted into the bag/box unit, where the quantity of leaves is shredded in the mulching impeller, where the vacuum portion additionally comprises a shoulder harness, where the shoulder harness comprises two shoulder straps, where the vacuum portion additionally comprises a waist harness, where the handle portion is hollow, such that the hollow tube is the inside of the handle portion, where the handle portion additionally comprises at least one side handle, where the vacuum portion additionally comprises a shredder, where the shredder cuts the quantity of leaves into a plurality of small particles, where the vacuum portion expels the plurality of small particles from a side exhaust vent into the attached bag/box unit, where the bag/box unit has a folded configuration and an expanded configuration, where the bag/box unit is biodegradable, where the bag/box unit is removably attached to the side exhaust vent by a card which slides into a mating slot on the vacuum portion, where the rake portion is attached to the handle portion by an interchangeable connector, where the rake head is attached to the handle portion through the interchangeable connector.

2. The device of claim 1, where the opening width is approximately four times longer than the opening height.

3. The device of claim 1, where the number of tines is 36.

4. The device of claim 1, where there are one or more tines present on the top side and on portions of the sides that are in contact with the top side.

5. The device of claim 1, where each of the tines are removable from the leaf rake suction head, thereby facilitating easy replacement should one of the tines be damaged or broken during use.

6. The device of claim 1, where the opening width is approximately four times longer than the opening height, where the number of tines is 36, where there are tines present on the top side and on portions of the sides that are in contact with the top side, where each of the tines are removable from the leaf rake suction head, thereby facilitating easy replacement should one of the tines be damaged or broken during use.

7. A device for collecting and processing leaves, comprising a rake portion, a handle portion, a connector, a vacuum portion, and a bag/box unit, where the handle portion additionally comprises a hollow tube, where the rake portion additionally comprises a plurality of tines and a leaf rake suction head, wherein the leaf rake suction head has a bottom side, a top side and two side panels, there the two side panels connect the top side to the bottom side, where the bottom side, the top side and the two side panels form an opening, where the opening has an opening height and an opening width, there the opening width is longer than the opening height, where the top side has a plurality of tines arrayed from it to facilitate the raking of leaves, where each tine has a tine body and a tine end, where each of the tine bodies extends at a 180 degree angle from the top side, and where each of the tine ends comprises a roughly 90 degree bend in a downward direction, where the downward direction is toward the bottom side,

where the leaf rake suction head is connected to the hollow tube, and where the hollow tube is connected to the connector by a first quick connect, and where the connector is connected to the vacuum by a second quick connect, where the plurality of tines direct a quantity of leaves toward the leaf rake suction head, where the vacuum generates an amount of suction, where the amount of suction picks up the quantity of leaves from in front of the leaf rake suction head and pulls them through the leaf rake suction head, first through the hollow tube, second through the connector, and third, into the vacuum, and fourth, through a mulching impeller and exhausted into the bag/box unit, where the quantity of leaves is shredded in the mulching impeller, where the vacuum portion additionally comprises a shoulder harness, where the shoulder harness comprises two shoulder straps, where the vacuum portion additionally comprises a waist harness, where the handle portion is hollow, such that the hollow tube is the inside of the handle portion, where the handle portion additionally comprises at least one side handle, where the vacuum portion additionally comprises a shredder, where the shredder cuts the quantity of leaves into a plurality of small particles, where the vacuum portion expels the plurality of small particles from a side exhaust vent into the attached bag/box unit, where the bag/box unit has a folded configuration and an expanded configuration, where the bag/box unit is biodegradable, where the bag/box unit is removably attached to the side exhaust vent by a card which slides into a mating slot on the vacuum portion, where the rake portion is attached to the handle portion by an interchangeable connector, where the rake head is attached to the handle portion through the interchangeable connector.

8. The device of claim 7, where the opening width is approximately four times longer than the opening height.

9. The device of claim 7, where the number of tines is 36.

10. The device of claim 7, where there are tines present on the top side and on portions of the sides that are in contact with the top side.

11. The device of claim 7, where each of the tines is removable from the leaf rake suction head, thereby facilitating easy replacement should one of the tines be damaged or broken during use.

12. The device of claim 7, where the opening width is approximately four times longer than the opening height, where the number of tines is 36, where there are tines present on the top side and on portions of the sides that are in contact with the top side, where each of the tines are removable from the leaf rake suction head, thereby facilitating easy replacement should one of the tines be damaged or broken during use.

13. The device of claim 7, where the vacuum portion contains a vacuum, and where the vacuum is powered by a source of power, where the source of power is selected from the group consisting of a rechargeable battery and an electrical cord.

14. The device of claim 13, where the vacuum portion additionally comprises a shoulder harness, where the shoulder harness comprises two shoulder straps, and wherein the vacuum portion additionally comprises a waist harness.

15. The device of claim 14, where the handle portion is hollow, such that the hollow tube is the inside of the handle portion, wherein the opening width is approximately four times longer than the opening height, where the number of tines is 36, where there are tines present on the top side and on portions of the sides that are in contact with the top side, where each of the tines are removable from the leaf rake suction head, thereby facilitating easy replacement should one of the tines be damaged or broken during use.

16. The device of claim 15, where the handle portion additionally comprises at least one side handle, where the vacuum portion additionally comprises a shredder, where the shredder cuts the quantity of leaves into a plurality of small particles, where the quantity of leaves is shredded in the mulching impeller.

17. The device of claim 16, where the vacuum portion expels the plurality of small particles from a side exhaust vent into bag/box unit.

18. The device of claim 17, where the vacuum expels the plurality of small particles from a side exhaust vent into the bag/box unit, where the bag/box unit is disposable and biodegradable, where the bag/box unit is biodegradable and has a folded configuration and an expanded configuration.

\* \* \* \* \*